United States Patent [19]

Railsback

[11] Patent Number: 4,545,927
[45] Date of Patent: Oct. 8, 1985

[54] CONDUCTIVE (HARD) RUBBER COMPOSITIONS

[75] Inventor: Henry E. Railsback, Bartlesville, Okla.

[73] Assignee: Phillips Petroleum Company, Bartlesville, Okla.

[21] Appl. No.: 403,211

[22] Filed: Jul. 29, 1982

[51] Int. Cl.$^4$ ............................................. H01B 1/06
[52] U.S. Cl. ...................................... 252/511; 252/502; 252/503; 252/512; 252/513; 252/514; 252/515; 524/495; 524/439; 524/440; 524/441; 524/500; 524/502; 525/197; 525/198
[58] Field of Search ............... 252/511, 512, 502, 503, 252/513, 514, 515; 524/495, 496, 439, 440, 441, 500, 502, 515, 568, 571, 575.5; 523/206; 525/194–198, 192

[56] References Cited

U.S. PATENT DOCUMENTS

| | | | |
|---|---|---|---|
| 3,123,583 | 3/1964 | Howard et al. | 525/198 |
| 3,200,056 | 8/1965 | Bond et al. | 204/154 |
| 3,257,351 | 6/1966 | Kraus et al. | 523/333 |
| 3,264,253 | 8/1966 | McCullough et al. | 524/584 |
| 3,325,442 | 6/1967 | McManimie et al. | 524/855 |
| 3,427,264 | 2/1969 | Forster et al. | 524/495 |
| 3,609,104 | 9/1971 | Ehneich | 252/511 |
| 3,760,495 | 9/1973 | Meyer | 252/511 |
| 3,793,476 | 2/1974 | Misiura et al. | 174/102.83 |
| 3,849,345 | 11/1974 | Snavely | 252/511 |
| 3,970,863 | 7/1976 | Kishikawa et al. | 200/61.03 |
| 4,005,054 | 1/1977 | Bonnefon . | |
| 4,098,945 | 7/1978 | Oehmke | 252/514 |
| 4,124,747 | 11/1978 | Murer et al. | 252/511 |
| 4,125,680 | 11/1978 | Shropshire | 429/149 |
| 4,147,668 | 4/1979 | Chiklis | 252/503 |
| 4,150,193 | 4/1979 | Burns | 252/511 |
| 4,151,126 | 4/1979 | Aldeman | 252/511 |
| 4,152,386 | 5/1979 | Winter | 252/512 |
| 4,153,749 | 5/1979 | Klein | 428/95 |
| 4,265,789 | 5/1981 | Christopherson | 252/511 |

*Primary Examiner*—Josephine L. Barr
*Attorney, Agent, or Firm*—Lyell H. Carver

[57] ABSTRACT

Curable conductive rubber blends of (A) a Masterbatch blend of an (a) dispersing component having a limited compatibility with rubber and (b) a conductor selected from conductive carbon blacks and metal powders, is (B) blended with (c) a rubber, and the resulting conductive blend is then cured/molded as desired. The technique provides a method/product uniformly electrically conductive of very low resistivity with quite modest amounts of conductive filler.

18 Claims, No Drawings

CONDUCTIVE (HARD) RUBBER COMPOSITIONS

FIELD OF THE INVENTION

It has proven difficult to make electrically conductive carbon black-loaded rubber stocks without using relatively high loadings of the carbon black and/or using high structure carbon black. yet, conductive hard rubber stocks are highly desirable in preparation of (cured) shoe soles, industrial tires, and the like, or in the production of conductive tiling (tiles) and cove base material, for use near flammable solvents and/or explosives. Such compositions are needed to prevent static buildup and spark discharge which might, in such environments, cause an explosion.

It became apparent to me that much if not most of the difficulty in preparation of curable conductive rubber stocks for ultimate preparation of conductive hard rubber compositions lay in the method of preparation. Needed has been an imaginative approach to produce a better product with moderate loading requirements. The moderate loading requirements are desired to avoid undesirable effects on the cured rubber properties encountered when very high loadings are employed, since high loadings tend to increase costs and to destroy or severely diminish desirable physical and chemical properties.

BRIEF SUMMARY OF THE INVENTION

In accordance with my invention/discovery, I prepare curable conductive rubber blends of (a) a dispersing component, (b) a conductor, and (c) a rubber.

These curable conductive rubber blends are prepared by my inventive technique which comprises: (A) preparing a Masterbatch blend of (a) a dispersing component, defined as one having a limited compatibility with a rubber (elastomer), with (b) a conductor selected from the group consisting of (b-1) conductive carbon blacks, (b-2) metal powders of a conductive nature, and (b-3) mixtures; and thereafter (B) blending the resulting a-b Masterbatch blend with (c) a rubber as hereinafter defined, resulting in an a-b-c curable conductive rubber blend. Thereafter, as a further and extended part of my invention, (C) molding, and (D) curing, the so-produced a-b-c blend to a hard durable product.

(A) Masterbatch Blend

In accordance with my invention, the first step is to prepare (A) a Masterbatch blend of (a) at least one dispersing component defined as one having a limited compatibility with a rubber, with (b) at least one conductor which is selected from the group consisting of (b-1) conductive carbon blacks, (b-2) metal powders of a conductive nature, and (b-3) mixtures, presently preferably a carbon black.

(a) Dispersing Component

The (a) dispersing component is a thermoplastic polymer having limited compatibility with the rubber. These thermoplastic polymer limited-compatibility dispersing components are selected from the group consisting of homo- and copolymers of the alpha-monoolefins of 2 to 10 carbon atoms per molecule, particularly such as low density polyethylenes (density about 0.91–0.93 g/cc), high density polyethylenes (density about 0.94–0.98 g/cc), polypropylene, polybutylene, polyisobutylene, poly(3-methylbutene), polypentene, poly(4-methyl-1-pentene), crystalline ethylene-propylene copolymers, ethylene (1-butene) copolymers, ethylene (1-hexene) copolymers, ethyl-propylene-1,3-butadiene terpolymers, and the like. It should be noted that in industrial usage a "polyethylene" may be but frequently is not a homopolymer, but may incorporate a few percent of a comonomer such as 1-hexene or 1-butene.

Other thermoplastic polymers suitable in accordance with my invention as an (a) dispersing component can be selected from materials such as polyvinyl chloride, polyvinylidene chloride, polyacrylonitrile, polystyrene, poly(alpha-methylstyrene), poly(vinyltoluene), the nylons, poly(ethyleneglycol terephthalate), poly(arylene oxides) particularly such as poly(phenylene oxide), and the like.

Any of these can be used alone or in admixture.

Presently preferred is a high density polyethylene for ease, effectiveness, and reasonable cost.

(b) Conductor

The (b) conductor as a part of my Masterbatch blend (A) is selected from at least one (b-1) of the conductive carbon blacks, and (b-2) metal powders of an electrically conductive nature.

(b-1) Conductive Carbon Blacks

The conductive carbon blacks can be selected from any of the carbon blacks listed in ASTM D-1765-76, herein incorporated expressly by reference to include carbon blacks so listed in accordance with their ASTM designations:

| N110 | N242 | N326 | N358 | N568 | N765 |
| N121 | N270 | N327 | N363 | N601 | N774 |
| N166 | N285 | N330 | N375 | N650 | N785 |
| S212 | N293 | N332 | N440 | N660 | N787 |
| N219 | N294 | N339 | N472 | N683 | N880 |
| N220 | S300 | N347 | N539 | N741 | N907 |
| N231 | S301 | N351 | N542 | N754 | N990 |
| N234 | S315 | N356 | N550 | N762 | |

Of course, I intend to include any other carbon blacks of similar nature suitable and effective for use in rubber compounding, such as Ketjenblack EC, Vulcan C and XC blacks, Acetylene blacks, and other so-called "conductive blacks," newer carbon blacks which are similar to any of the above but may be designated by other numbers, and, of course, mixtures.

Presently preferred for effectiveness and convenience are the carbon blacks designated as N550.

(b-2) Metal Powders/Particles

Optionally alone, or with a carbon black, is used (b-2) at least one metal powder or particle, of a conductive nature. These metal powders or particles should have an average particle size of about 0.1 to 100, preferably about 0.3 to 30, microns as measured by X-ray line broadening. The metal particles/powders may have any particle shape desired although, as is known, the selection thereof may depend upon the intended end use of the metal-filled product. Spherical shapes, platelets, prismatic shapes, whiskers, and the like, can be used.

Employable in accordance with my invention are the metals as the element, alone, in admixture, or as finely powdered alloys, of the elements aluminum, indium, tin, lead, bismuth, as well as Groups II-B through VII-B elements of the Periodic System including such as zinc, cadmium, scandium, titanium, zirconium, vanadium, chromium, molybdenum, tunsten, manganese, rhenium, iron, ruthenium, osmium, cobalt, rhodium, iridium, nickel, palladium, platinum, and so forth.

Particularly satisfactory for convenience and relative cheapness are aluminum, zinc, iron, nickel, tin, lead, and silver. Copper while conductive may in its metallic form be objectionable in some rubber compounding.

(b-3) Mixtures

Mixtures (b-3) of (b-1) one or more carbon blacks with (b-2) one or more metal powders or particles can be employed, in any relative proportion, such as a weight ratio of 1:99 to 99:1 b-1, b-2, as desired by the compounder.

Preparation of Masterbatch (A)

Masterbatch (A) can be prepared by any suitable mixing means that results in a uniform dispersion of the (b) conductive particles in the (a) dispersing component, either in dry form, or in the presence of minor amounts of processing aids such as fatty acids and their amides, glycerol esters, glycol esters, polyethylene glycol (and its esters), polyethylene waxes, petroleum hydrocarbon resins, metal stearates, phthalic acid esters and other derivatives, and the like. A solvent as such is not desirable.

Mixing temperatures employed should be preferably slightly above the melting point of the (a) dispersing component, but below the decomposition temperature thereof. Such temperatures are readily determinable by those skilled in the compounding arts.

Presently convenient and preferred is a presently preferred Masterbatch (A) prepared by admixing such as carbon black N550 with a high density polyethylene in a mixer such as a Banbury internal mixer at a temperature up to such as about 170° C. without the necessity of including any processing aids.

The weight ratio of (b) conductive particles with (a) the dispersing component in preparation of the (A) Masterbatch can vary widely, depending on the amount of the Masterbatch blend (A) that will ultimately be blended (B) with (c) the rubber component. The weight ratio necessary will vary depending on the conductivity of the black and/or metal, and the amount thereof in the Masterbatch. I have found that if the (A) Masterbatch itself is conductive, then by my mixing technique the resulting (B) blend will be adequately conductive.

Generally, the weight ratio of (b) conductive particles to (a) dispersing component in Masterbatch (A) should be such that its electrical resistivity is below about $10^6$ Ohm cm, preferably less than about 5 times $10^5$ Ohm cm, most preferably below about 5 times $10^4$ Ohm cm, so as to provide terblends in accordance with this invention having a resistivity of less than about $10^6$ Ohm cm, preferably less than about 5 times $10^4$ Ohm cm.

On a practical basis, the weight percentage ratio of conductive particles (b) depending on their resistivity usually will vary from about 10 to 80 weight percent, more usually about 40 to 60 weight percent, conductive particle in the (A) Masterbatch blend. Convenient to use and prepare is an about 50 weight percent admixture, meaning about equal parts by weight of the (b) conductive component and of the (a) dispersing component: for example, an admixture of about equal parts by weight of carbon black N550 with a high density polyethylene.

(c) Rubber

Suitable materials for the (c) rubber in which is blended the (a/b) Masterbatch (A) blend is any elastomeric polymer which meets the generally accepted definition of "elastomer": "polymers having the property of extensibility and elastic recovery, i.e., the ability to be stretched to at least twice their original length and to retract very rapidly to approximately their original length when released." *The Condensed Chemical Dictionary*, 9th Ed., (Van Nostrand Reinhold Co., 1977). The (c) rubbery components, in addition to being elastomeric, are cross-linkable, which after vulcanization (cross-linking) possess and exhibit the properties normally associated with vulcanized rubber.

The rubbery copolymers can be selected from homopolymers of a conjugated diene, such as those of 4 to 8 carbon atoms per molecule for availability, or copolymers thereof with a monovinyl aromatic hydrocarbon such as those of 8 to 12 carbon atoms per molecule. In the case of copolymers, the proportion of conjugated diene should be sufficient to maintain the elastomeric character of the copolymer which can be of a random, random block, block, linear, tapered, or radial character. Typical of the conjugated dienes are 1,3-butadiene, 2,3-dimethyl-1,3-butadiene, 2,4-hexadiene, and the like, presently preferred being butadiene and isoprene. Typical of the monovinylarenes are those such as styrene, alkylstyrenes, vinyltoluene, and the substituted styrenes such as methylstyrene, and the like. These polymers all can be readily prepared by means known in the art by solution or in appropriate cases by emulsion polymerization procedures. The rubbers can be oil-extended, if desired.

Natural rubbers are suitable, and should be included in the broad term of "rubber" as I use it herein. Typical of the natural rubbers are polymers of the character of "cis-1,4-polyisoprene," such as the standard Malaysian rubbers, Heveaplus MG rubbers, oil-extended natural rubbers, and the like.

Other monomeric components can be utilized in preparing useful cross-linkable elastomers. Other elastomers include such as butadiene-isobutylene copolymers, acrylonitrile-butadiene copolymers, acrylonitrile-butadiene-styrene terpolymers, ethylene-acrylic elastomers, amorphous ethylene/propylene rubbery copolymers, vinylacetate-ethylene copolymers, chlorinated polyethylene rubber, and the like. Again, I intend to use the term "elastomer" (rubber) in a broad term to include vulcanizable and cross-linkable materials which can be cured as I have described hereinabove. Those polymers with sufficient residual unsaturation can be sulfur-cured or peroxide cured, and those with substantially saturated character can be peroxide cured, as is known in the art.

Presently preferred for availability and usefulness are elastomeric materials selected from the vulcanizable butadiene/styrene copolymers particularly of the types utilized in the fabrication of rubber tires, such as SBR 1503 which are butadiene/styrene copolymers with a bound styrene content of about 24 weight percent and a number average molecular weight in the order of about 80,000 to 100,000.

Blending

Blending of the (a/b) Masterbatch (A) into the rubber (c) phase can be accomplished in any suitable mixing operation known to the rubber mixing arts. Presently preferred as convenient is a roll mill operated at "full steam" which is a term understood by those skilled in the arts. Curing agents normally are added toward the end of the mixing process to avoid premature curing.

Of course, minor amounts of process oils, internal lubricants, mold release agents, stabilizers, and the like, can be added at the time of blending, or can be included as a component of the (c) rubber.

It should be recognized that the (c) rubber or elastomer itself can and normally will contain minor effective amounts of various components pre-added for a variety of requirements known in the art, such as suitable curing agents such as organic peroxides or sulfur, zinc oxide and other activators, benzothiazyl sulfenamides such as N-cyclohexyl-2-benzothiazolesulfenamide or other accelerators, processing, agents, varying amounts of process oils, plasticizers, mold release agents and/or stabilizers, since there are quite a variety of additives known and perennially used in the blending/processing/curing arts for various desirable effects.

Other components can be included in the overall total blends for various purposes, including "white carbon" or the silicas, various of the alkyl silicones or other treating agents which in some cases are highly to be desired in order to "bind" or "couple" metallic particles to the elastomer, other diluents, fillers, colorants, and the like. Such components are excluded in determining the proportions of my inventive blends.

Presently preferably are weight ratios of an electrically conductive a/b Masterbatch (A): (c) rubber phase of about 1.1:1 to 5:1, preferably about 1.5:1 to 2:1.

Normally the weight ratios of the Masterbatch (A) to the rubber phase are selected so as to provide terblends having an electrical resistivity of less than about $10^6$ Ohm cm, presently preferably less than about 5 times $10^5$ Ohm cm.

Resistivity is a term of art denoting the unit resistance of a material. It is the reciprocal of conductivity. Thus, a material which has a high conductivity conversely has a low resistivity. The terms "insulating" and "conductive" are perforce relative terms.

The accumulation of static electrical charges on rubber articles often causes serious hazardous conditions to arise in that the electrical potential may become so great that a discharge of the electrical potential occurs in the form of a spark which then may ignite inflammable or explosive materials in the vicinity, or at least cause some discomfort to a person coming into contact therewith. To minimize the hazardous sparking caused by the instantaneous discharge of static electrical charges, rubbery bodies in which static electrical charges may develop should desirably be fabricated of a composition having a low electrical resistivity allowing static electricity formed therein to be (harmlessly) conducted to an electrical ground before an accumulation of static electrical charges occurs sufficient to cause a spark to form between two or more bodies.

Since rubbery compositions ordinarily are inherent poor electrical conductors, special compounding techniques are a necessity in order to obtain electrically conductive rubber articles, that is, with a sufficiently low electrical resistivity. The problem has been to maintain conducting pathways. In accordance with my invention, I have solved this problem simply, neatly, and effectively.

My inventive terblends can be utilized for manufacturing conductive and/or semi-conductive articles including such as industrial tires, shoe soles, belts, pipes, tiles, and cove base strips. Such articles are used under conditions in which static buildup of electrical charges is undesirable. The articles can be readily prepared by molding, or extrusion, with simultaneous or with subsequent curing as may be desirble.

Curing

Vulcanization of my inventive terblends comprises a technique of molding at temperatures such as about 100° C. to 220° C. for periods of time ranging from about 5 minutes to several hours.

Molding techniques include such as placing pre-shaped rubber articles into a compression mold and heating them under pressure, or injecting rubber compounds into said mold followed by subsequent heating under pressure. In addition, curing can also be accomplished by heating extruded articles with low pressure steam, a technique applied for making mechanical goods such as hoses, belts, straps and strips. Vulcanization of my inventive blends can be carried out in a compression mold at such as about 140° to 160° C. for about 20 to 40 minutes.

EXAMPLES

The following Examples are intended to assist in illustrating my invention, and to further illustrate the presently preferred, to the extent of my present experience, in practicing my invention. Particular components, ratios, modes, are intended to be illustrative of my invention, but not limitative of the reasonable scope thereof and thus should be considered a part of my disclosure and not a restriction thereon.

EXAMPLE I

The runs in this Example illustrate the low electrical resistivity of my inventive blends containing (A) Masterbatch I (1:1 weight ratio blend of (b) carbon black as the conductor, and (a) polyethylene as the dispersing agent) versus three control runs.

A Masterbatch (A) of (a) polyethylene/(b) carbon black blend (Masterbatch I), the a/b component of my inventive terblends, was prepared by admixing 50 parts by weight of carbon black N550 (b) with 50 parts by weight of a high-density polyethylene homopolymer (a) in a "BR" Banbury mixer at 90° C. water temperature, second speed setting (118 rpm). The resulting (a/b) mixture (A) was dumped at a temperature of about 170° C.

A control (a/b) blend (Masterbatch II) containing 50 parts by weight of an (a) SBR butadiene/styrene copolymer and (b) 50 parts by weight of carbon black N550 was prepared according to the same mixing procedure as described for Masterbatch I.

Pertinent physical properties of each Masterbatch are listed in Masterbatch Table I:

MASTERBATCH TABLE I

| | Masterbatch I | Masterbatch II |
|---|---|---|
| Electrical Resistivity[b] Ohm × cm | 2 × 10$^7$ | 2.7 × 10$^4$ |
| Shore A Hardness[c] | 84 | 87 |
| Tensile Strength[d], MPa | —[a] | 16.5 |
| Elongation[d], % | —[a] | 140 |

[a] too brittle to test
[b] determined according to ASTM D 257
[c] determined according to ASTM D 2240
[d] determined according to ASTM D 412

Four rubber blends were compounded using Masterbatches I and II. These blends contained equal amounts (50 grams) of carbon black per 100 grams of polymer (either Philprene 1503 rubber of Philprene 1503 plus polyethylene). Runs 1 and 2 were milled at "hand warm" conditions and Runs 3 and 4 were milled at "full steam". The four blends were prepared on a 6×12 roll mill according to compounding Recipe I:

| | Compounding Recipe I | | | |
|---|---|---|---|---|
| Run | 1 (Control) | 2 (Control) | 3 (Control) | 4 (Invention) |
| Butadiene/Styrene Copolymer[a], parts by weight | 100 | 50 | 75 | 50 |
| Polyethylene[b], parts by weight | — | — | 25 | — |
| Carbon Black N-550[c], parts by weight | 50 | — | 50 | — |
| Masterbatch II[d], parts by weight | — | 100 | — | — |
| Masterbatch I[e], parts by weight | — | — | — | 100 |
| Zinc oxide, parts by weight | 3 | 3 | 3 | 3 |
| Sulfur, parts by weight | 1.8 | 1.8 | 1.8 | 1.8 |
| Santocure[f], parts by weight | 1.0 | 1.0 | 1.0 | 1.0 |

[a] Philprene ® 1503, a butadiene/styrene copolymer, molecular weight $M_n$ = 80,000–100,000, bound styrene content of about 23.5 percent by weight, marketed by Phillips Petroleum Company.
[b] Polyethylene (homopolymer), Marlex ® EMN TR-885; density 0.965 g/cc ASTM D-1505-68, melt index 30 g/10 min. ASTM D-1238-70, marketed by Phillips Petroleum Company.
[c] Philblack ® N-550, surface area about 42 $m^2/g$ determined by $N_2$ adsorption, DBP absorption 115 ml/100g, marketed by Phillips Petroleum Company.
[d] 50% by weight of Philback N-550 and 50% by weight of Philprene 1503.
[e] 50% by weight of Philback N-550 and 50% by weight of Marlex EMN TR-885 high-density polyethylene homopolymer.
[f] N—cyclohexyl-2-benzothiazolesulfenamide (Monsanto).

Total mixing time for each run on the 6×12 roll mill was about 13 minutes. Carbon black was added about 3 minutes after start during a time period of 6 minutes. Banding, cutting, and rolling required 1, 2, and 1 minute, respectively. Batches were remilled twice for 3 minutes. Curing agents were added after the first remill.

The four blends prepared according to Recipe I were cured at 150° C. for 30 minutes. Slabs of 6"×6"×0.08" were used for electrical resistivity measurements. Other physical properties were determined on 4"×4"×0.08" slabs. Results are summarized in Data Table I for Cured Rubbers:

Data TABLE I

| | Cured Rubbers | | | |
|---|---|---|---|---|
| Run | 1 (Control) | 2 (Control) | 3 (Control) | 4 (Invention) |
| 200% Modulus[a], MPa | 9.0 | 8.0 | 17.2 | 18.2 |
| Tensile strength[a], MPa | 20.4 | 19.7 | 23.1 | 18.6 |
| Elongation[a], % | 370 | 340 | 310 | 210 |
| Shore A Hardness[b] | 69 | 65 | 66 | 96 |
| Electrical Resistivity[c]: | | | | |
| not aged, Ohm × cm | $3.8 \times 10^{10}$ | $5.5 \times 10^{13}$ | $1.6 \times 10^{13}$ | $1.1 \times 10^3$ |
| aged for 7 days[d], Ohm × cm | $8.5 \times 10^{10}$ | $8.9 \times 10^{13}$ | $2.0 \times 10^{13}$ | $3.0 \times 10^5$ |
| aged for 14 days[d], Ohm × cm | $1.9 \times 10^{11}$ | $1.2 \times 10^{14}$ | $2.2 \times 10^{13}$ | $3.2 \times 10^4$ |

[a] determined according to ASTM D 412
[b] determined according to ASTM D 2240
[c] determined according to ASTM D 257
[d] at 70° C. in water Data in Data Table I for Cured Rubbers show that my cured inventive terblend (Run 4) comprising 50 parts by weight of butadiene-styrene rubber and 100 parts by weight of a 1:1 weight ratio carbon black-polyethylene masterbatch, possessed a considerably lower electrical resistivity than any of the three control runs each of which contained an equal amount of carbon black. Tensile and hardness properties of inventive Blend 4 were quite acceptable.

In addition, a comparison of data for Runs 1 and 3 clearly shows that replacing a substantial portion of rubber with polyethylene did not lower but rather increased the electrical resistivity. Therefore, the low electrical resistivity of my inventive terblend (Run 4) prepared by a two-step mixing process cannot be attained in a terblend prepared by only one mixing step (Run 3).

EXAMPLE II

The results of the runs in this Example demonstrate that a desirably low electrical resistivity of my inventive terblends comprising a rubber phase (c) and an (a/b) polyethylene/carbon black phase Masterbatch I was attained only at a weight percentage of more than 50 percent of the Masterbatch I in this particular system using the particular components and ratios shown.

Blends were mixed, according to the procedure described in Example I, on a 6×12 roll mill, at "full steam". Curatives were added toward the end of the mixing process.

Blends were prepared according to Compounding Recipe II:

| | Compounding Recipe II | | | | | |
|---|---|---|---|---|---|---|
| Run | 5 | 6 | 7 | 8 | 9 | 10 |
| Philprene ® 1503, parts by weight 100 | 100 | 100 | 100 | 100 | 100 | 100 |
| Masterbatch I, parts by weight 150 | 0 | 20 | 40 | 70 | 100 | 150 |
| Zinc Oxide, parts by weight 1.8 | 1.8 | 1.8 | 1.8 | 1.8 | 1.8 | 1.8 |
| Santocure ®, parts by weight 1.0 | 1.0 | 1.0 | 1.0 | 1.0 | 1.0 | 1.0 |

Curing was carried out at 150° C. for 30 minutes. Slab sizes were the same as described in Example I. Results are summarized in Data Table II for Cured 50:50:100R Rubbers:

Data TABLE II for Cured Rubbers

| Run | 5 (Control) | 6 (Control) | 7 (Control) | 8 (Control) | 9 (Control) | 10 (Invention) |
|---|---|---|---|---|---|---|
| 200% Modulus, MPa | 1.4 | 2.1 | 4.3 | 8.1 | 9.1 | 12.2 |
| Tensile strength, MPa | 2.3 | 8.4 | 15.4 | 18.8 | 16.6 | 14.5 |
| Elongation, % | 330 | 500 | 550 | 580 | 640 | 470 |
| Shore A Hardness | 43 | 55 | 64 | 78 | 90 | 90 |
| Electrical Resistivity (not aged), Ohm × cm | $2.2 \times 10^{14}$ | $2.8 \times 10^{14}$ | $2.5 \times 10^{14}$ | $1.8 \times 10^{14}$ | $1.1 \times 10^{14}$ | $4.8 \times 10^{4}$ |

Data in Data Table II for Cured Rubbers clearly show that the cured inventive terblend of Run 10 combined low electrical resistivity with high tensile strength, high elongation, and acceptable hardness.

The disclosure, including data, has illustrated the value and effectiveness of my invention. The examples, the knowledge and background of the field of the invention and the general principles of chemistry and of other applicable sciences have formed the bases from which the broad descriptions of my invention including the ranges of conditions and the generic groups of operant components have been developed, and formed the bases for my claims here appended.

I claim:

1. A process for preparing a conductive rubber compound exhibiting an electrical resistivity of less than about $10^6$ Ohm cm, which comprises:
    (A) blending (a) a dispersing component which is a thermoplastic polymer, and a conducting amount of (b) at least one conductor selected from the group consisting of (b-1) conductive carbon blacks, (b-2) metal powders or metal particles, and (b-3) mixtures, thereby preparing a Masterbatch (A), wherein said Masterbatch (A) contains in the range of about 10 to 80 weight (b), and
    (B) blending said Masterbatch (A) with (c) at least one elastomer in a proportion effective to provide low resistivity to said elastomer, wherein said effective proportion is about 1.1:1 to 5:1 Masterbatch (A):(c),
thereby preparing said conductive rubber compound.

2. The process according to claim 1 wherein said Masterbatch (A) comprises about 10 to 80 weight percent (b) and the balance said (a) dispersing component.

3. The process according to claim 2 wherein said Masterbatch (A) comprises about 40 to 60 weight percent said (b) and correspondingly about 60 to 40 weight percent said (a) dispersing component.

4. The process according to claim 2 wherein said dispersing component (a) is selected from the group consisting of homopolymers and copolymers of alpha-olefins of 2 to 10 carbon atoms per molecule, polyvinyl chloride, polyvinylidene chloride, polyacrylonitrile, polystyrene, poly(alpha-methylstyrene), poly(vinyltoluene), nylon, poly(ethyleneglycol terephthalate), poly(arylene oxide), and mixtures;

5. The process according to claim 4 wherein said (c) elastomer is selected from the group consisting of natural rubbers, polybutadiene, polyisoprene, butadiene/styrene copolymers, isoprene/styrene copolymers, butadiene and isoprene copolymers of alpha-methylstyrene, butadiene/isobutylene copolymers, acrylonitriles/butadiene copolymers, acrylonitrile/butadiene/styrene terpolymers, and amorphous ethylene/propylene rubbery copolymers.

6. The process according to claim 5 wherein said (a) dispersing component is selected from said homopolymers and copolymers of alpha-monoolefins.

7. The process according to claim 6 employing a weight ratio of Masterbatch (A) to the (c) elastomer sufficient to provide an electrical resistivity of less than about $10^6$ Ohm cm.

8. The process according to claim 7 wherein said (a) polymer of an alpha-monoolefin is a high density polyethylene.

9. The process according to claim 8 employing a weight ratio of said Masterbatch (A) to (c) elastomer of about 1.1:1 to 5:1.

10. The process according to claim 9 wherein said (b) is a said (b-1) conductive carbon black.

11. The process according to claim 10 wherein said carbon black is an N550 carbon black.

12. A process for preparing a conductive elastomer compound exhibiting a resistivity of less than about $10^6$ Ohm cm, which comprises:
    (A) blending (a) a dispersing component which is a thermoplastic polymer having a limited compatibility with said elastomer and (b) at least one conductor selected from the group consisting of (b-1) conductive carbon blacks, (b-2) metal powders or metal particles, and (b-3) mixtures, thereby preparing a Masterbatch (A) wherein said Masterbatch (A) contains in the range of about 10 to 80 weight percent (b) sufficient to produce a resistivity in said (A) of less than about $10^6$ Ohm cm; and
    (B) blending said Masterbatch (A) with (c) at least one elastomer in a proportion of about 1.1:1 to 5.1, thereby producing said conductive elastomer compound.

13. The process according to claim 1 employing a weight ratio of said Masterbatch (A) to (c) rubber of about 1.5:1 to 2:1.

14. The rubber compound of claim 1, 10, 12, or 13.

15. The process according to claim 12 wherein said Masterbatch (A) comprises about 40 to 60 weight percent (b) and the balance said (a) dispersing component; and said (B) proportion employs about 1.5:1 to 2:1 weight ratio (A):(c).

16. The process according to claim 15 wherein said (a) dispersing component is selected from homopolymers and copolymers of alpha-monoolefins; said (b) is selected from carbon blacks; and said (c) elastomer is selected from the group consisting of natural rubbers, conjugated diene homopolymers and copolymers with monovinylarenes, butadiene or isoprene copolymers with alpha-methylstyrene, butadiene/isobutylene copolymers, acrylonitriles/butadiene copolymers, acrylonitrile/butadiene/styrene terpolymers, and amorphous ethylene/propylene rubbery copolymers.

17. The process according to claim 16 wherein said (a) polymer of an alpha-monoolefin is a high density polyethylene; said (b) is a carbon black; and said (c) is a butadiene/styrene copolymer.

18. The process according to claim 13 wherein said carbon black is an N550 carbon black.

* * * * *